(12) United States Patent
Ruehle et al.

(10) Patent No.: US 9,009,448 B2
(45) Date of Patent: Apr. 14, 2015

(54) MULTITHREADED DFA ARCHITECTURE FOR FINDING RULES MATCH BY CONCURRENTLY PERFORMING AT VARYING INPUT STREAM POSITIONS AND SORTING RESULT TOKENS

(75) Inventors: Michael Ruehle, Albuquerque, NM (US); Umesh Ramkrishnarao Kasture, Maharashtra (IN); Vinay Janardan Naik, Maharashtra (IN); Nayan Amrutlal Suthar, Maharashtra (IN); Robert J. McMillen, Carlsbad, CA (US)

(73) Assignee: Intel Corporation, Santa Clara, CA (US)

( * ) Notice: Subject to any disclaimer, the term of this patent is extended or adjusted under 35 U.S.C. 154(b) by 657 days.

(21) Appl. No.: 13/353,117

(22) Filed: Jan. 18, 2012

(65) Prior Publication Data

US 2013/0046954 A1     Feb. 21, 2013

Related U.S. Application Data

(60) Provisional application No. 61/524,390, filed on Aug. 17, 2011.

(51) Int. Cl.
| | | |
|---|---|---|
| G06F 7/20 | (2006.01) | |
| G06F 9/46 | (2006.01) | |
| G06F 9/38 | (2006.01) | |
| H04L 12/851 | (2013.01) | |
| H04L 12/819 | (2013.01) | |

(52) U.S. Cl.
CPC ............... *G06F 7/20* (2013.01); *G06F 9/3885* (2013.01); *G06F 9/46* (2013.01); *H04L 47/2483* (2013.01); *H04L 47/215* (2013.01)

(58) Field of Classification Search
CPC .................. G06F 17/30985; G06F 2207/025; G06F 9/3851
USPC ..................................................... 712/E9.053
See application file for complete search history.

(56) References Cited

U.S. PATENT DOCUMENTS

| | | | |
|---|---|---|---|
| 7,512,634 B2 | 3/2009 | McMillen | |
| 7,539,032 B2 * | 5/2009 | Ichiriu et al. ............... | 365/49.17 |
| 7,689,530 B1 * | 3/2010 | Williams et al. ................ | 706/62 |
| 7,788,206 B2 | 8/2010 | McMillen et al. | |
| 7,945,528 B2 | 5/2011 | Cytron et al. | |
| 8,015,208 B2 | 9/2011 | McMillen | |
| 2003/0065800 A1 * | 4/2003 | Wyschogrod et al. ........ | 709/230 |
| 2005/0273450 A1 | 12/2005 | McMillen et al. | |
| 2008/0270342 A1 | 10/2008 | Ruehle | |
| 2008/0270833 A1 | 10/2008 | McMillen | |
| 2008/0271141 A1 * | 10/2008 | Goldman et al. ............... | 726/22 |
| 2009/0063825 A1 | 3/2009 | McMillen et al. | |
| 2011/0125695 A1 | 5/2011 | Ruehle | |

* cited by examiner

*Primary Examiner* — Kenneth Kim
(74) *Attorney, Agent, or Firm* — Suiter Swantz pc llo

(57) ABSTRACT

Disclosed is an architecture, system and method for performing multi-thread DFA descents on a single input stream. An executer performs DFA transitions from a plurality of threads each starting at a different point in an input stream. A plurality of executers may operate in parallel to each other and a plurality of thread contexts operate concurrently within each executer to maintain the context of each thread which is state transitioning. A scheduler in each executer arbitrates instructions for the thread into an at least one pipeline where the instructions are executed. Tokens may be output from each of the plurality of executers to a token processor which sorts and filters the tokens into dispatch order.

23 Claims, 3 Drawing Sheets

US 9,009,448 B2

MULTITHREADED DFA ARCHITECTURE FOR FINDING RULES MATCH BY CONCURRENTLY PERFORMING AT VARYING INPUT STREAM POSITIONS AND SORTING RESULT TOKENS

CROSS-REFERENCE TO RELATED APPLICATION

The present application is based upon and claims the benefit of U.S. Provisional Patent Application Ser. No. 61/524,390, filed Aug. 17, 2011, by Michael Ruehle, Umesh Ramkrishnarao Kasture, Vinay Janardan Naik, Nayan Amrutlal Suthar, and Robert J. McMillen, entitled "Multi-Threaded DFA Architecture", which application is hereby specifically incorporated herein by reference for all that it discloses and teaches.

BACKGROUND

With the maturation of computer and networking technology, the volume and types of data transmitted on the various networks have grown considerably. For example, symbols in various formats may be used to represent data. These symbols may be in textual forms, such as ASCII, EBCDIC, 8-bit character sets or Unicode multi-byte characters, for example. Data may also be stored and transmitted in specialized binary formats representing executable code, sound, images, and video, for example.

Along with the growth in the volume and types of data used in network communications, a need to process, understand, and transform the data has also increased. For example, the World Wide Web and the Internet comprise thousands of gateways, routers, switches, bridges and hubs that interconnect millions of computers. Information is exchanged using numerous high level protocols like SMTP, MIME, HTTP and FTP on top of low level protocols like TCP, IP or MAP. Further, instructions in other languages may be included with these standards, such as Java and Visual Basic.

As information is transported across a network, there are numerous instances when information may be interpreted to make routing decisions. In an attempt to reduce the complexity associated with routing decisions, it is common for protocols to be organized in a manner resulting in protocol specific headers and unrestricted payloads. Subdivision of the payload information into packets and providing each packet with a header is also common at the lowest level, for example TCP/IP. This enables the routing information to be at a fixed location thus making it easy for routing hardware to find and interpret the information.

SUMMARY

An embodiment of the invention may therefore comprise an architecture for finding rule matches within an input stream. The architecture may comprise a symbol buffer, a dispatcher, an instruction memory and at least one executer. The dispatcher is operably connected to the symbol buffer and operably enabled to fetch symbols from said symbol buffer, and to dispatch instructions, a pointer and data. The instruction memory holds instructions for transitions from DFA states other than from the DFA root state. The at least one executer receives the root instructions, pointer and data from the dispatcher and fetches subsequent instructions from the instruction memory, receives next symbols from the symbol buffer, executes said instructions and performs parallel DFA descents starting in a root state at varying positions in an input stream, and outputs a plurality of tokens from a plurality of the parallel DFA descents.

The at least one executer comprises a plurality of thread contexts which receive the instructions from the dispatcher and instruction memory and which maintains a context for a particular thread which is relevant to a current descent being performed and a scheduler which selects from the plurality of thread contexts and schedules a thread into an at least one pipeline on each clock cycle. The threads transition concurrently within each of said executers depending on arbitration into the pipeline. The at least one pipeline is an execution pipeline which executes the instructions received from the dispatcher and the instruction memory.

An embodiment of the invention may further comprise a system for finding rules matches within an input stream. The system may comprise at least one instruction executer, a plurality of thread contexts, a scheduler and at least one pipeline. Parallel threads are dispatched to each of said at least one executer from a dispatcher, said dispatched threads comprising start state instructions for a DFA descent from a root state, to the plurality of thread contexts, and within said at least one instruction executer said scheduler arbitrates the plurality of thread contexts into said at least one pipeline so that multiple threads perform concurrent DFA descents, and each of said at least one executer outputs token information to a token processor.

An embodiment of the invention may further comprise a method of finding rule matches within an input stream. The method may include the steps of fetching root state instructions from a start block cache, dispatching said root state instructions to an at least one executer, communicating non-root state DFA descent instructions from an instruction memory to the executer, and executing a plurality of threads of a DFA on an input stream based on the instructions from the start block cache and the instruction memory. Each thread is started in a root state at varying positions in the input stream and the plurality of threads execute concurrently within the executer without regard for the state of another thread.

DETAILED DESCRIPTION OF THE EMBODIMENTS

Figure 1:
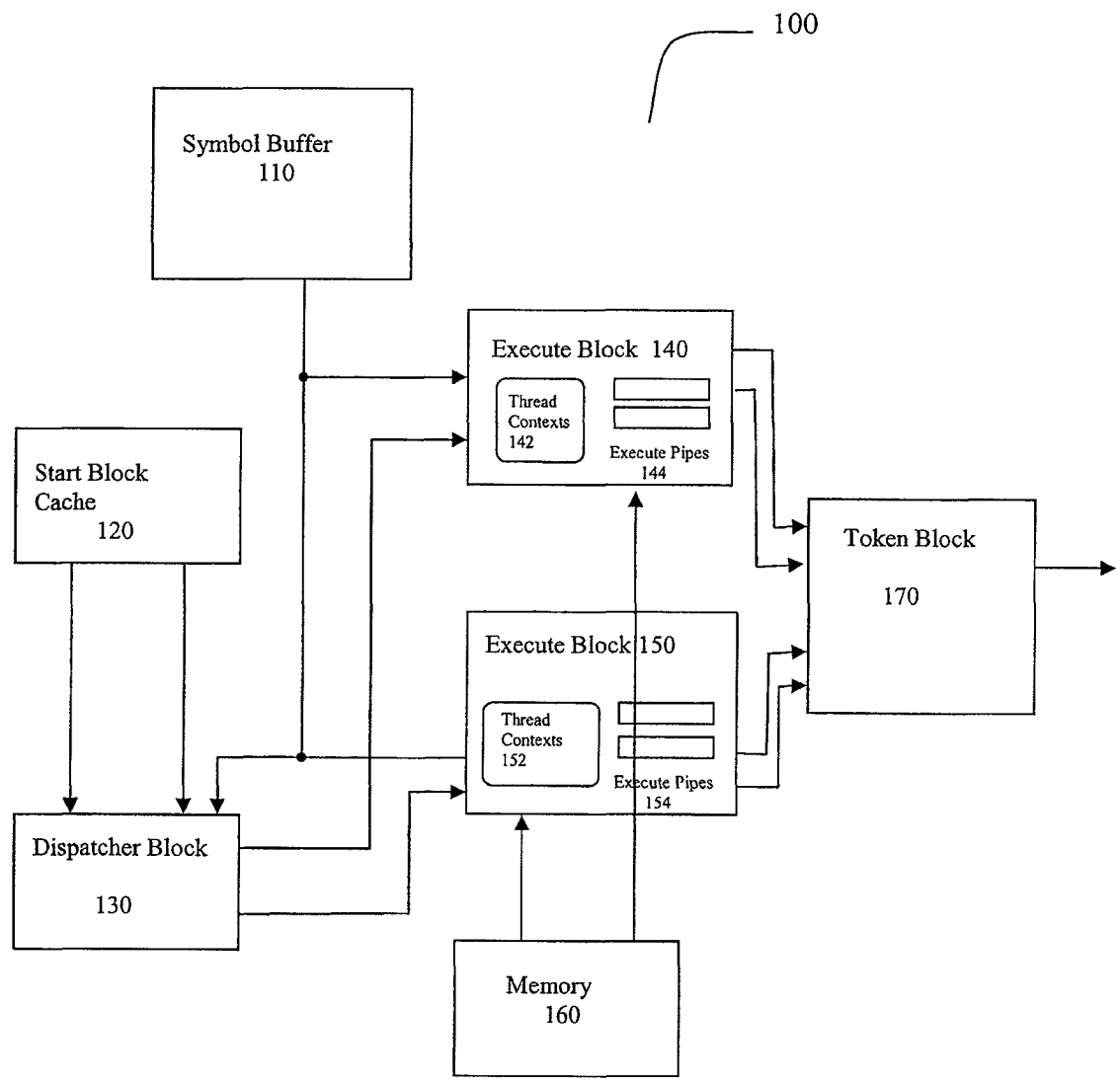
FIG. 1 is a block diagram of a regular expression matching architecture.

With the increasing nature of the transmission of information, there is an increasing need to be able to identify the contents and nature of the information as it travels across servers and networks. Once information arrives at a server, having gone through all of the routing, processing and filtering along the way, it is typically further processed. This further processing necessarily needs to be high speed in nature.

The first processing step that is typically required by protocols, filtering operations, and document type handlers is to organize sequences of symbols into meaningful, application specific classifications. Different applications use different terminology to describe this process. Text oriented applications typically call this type of processing lexical analysis. Other applications that handle non-text or mixed data types call the process pattern matching.

Performing lexical analysis or pattern matching is generally a computationally expensive step. This is because every symbol of information needs to be examined and dispositioned.

Regular expressions are well known in the prior art and are used for pattern matching and lexical analysis. Regular expressions provide a concise and flexible means for "matching" strings of text, such as particular characters, words, or patterns of characters. Abbreviations for "regular expression" include "regex" and regexp" and these abbreviations may be used throughout this specification interchangeably with each other and with the term "regular expression". A regular expression is written in a formal language that can be interpreted by a regular expression processor, which examines text or other characters and identifies parts that match the provided rules of the regular expression. A regular expression in its simplest expression is a pattern. It is an expression that specifies a set of strings. Examples of specifications that could be expressed in a regular expression are as follows:

the sequence of characters "car" appearing consecutively in any context, such as in "car", "cartoon", or "bicarbonate"

the sequence of characters "car" occurring in that order with other characters between them, such as in "Icelander" or "chandler"

the word "car" when it appears as an isolated word the word "car when preceded by the word "blue" or "red"

the word "car" when not preceded by the word "motor"

a dollar sign immediately followed by one or more digits, and then optionally a period and exactly two more digits (for example, "$100" or "$245.98").

These sequences are simple and are intended only for purposes of example. Specifications of great complexity are conveyable by regular expressions.

Regular expressions are used by many text editors, utilities, and programming languages to search and manipulate text based on patterns. Some of these languages, including Perl, Ruby, AWK, and Tcl, may integrate regular expressions into the syntax of the core language itself. Other programming languages like .NET languages, Java, and Python provide regular expressions through standard libraries.

To match regular expressions or similar pattern matching rules, two main types of state machines may be constructed, nondeterministic and deterministic finite automata (NFAs and DFAs). NFAs are known to support hardware parallelism, but DFAs are traditionally executed sequentially.

Sequential DFA execution is relatively slow because each step consuming an input symbol must make a transition in a large state machine in external memory. This requires requesting and receiving at least one instruction, decoding and executing that instruction, and determining the next instruction to request. In high frequency logic, multiple clock cycles are needed to make a single step. For commonly used non-Aho-Corasick DFAs, multiple such steps are often needed for each input symbol. Thus, scan speed through one input stream is limited to one symbol in several clock cycles. As always, in logic design, these several clock cycles may be compressed into fewer cycles by doing more work in each cycle, but at a cost of reduced clock frequency, so that throughput in symbols per second remains slow.

Sequential DFA execution is also inefficient in terms of silicon area and power, because hardware resources are dedicated to scanning a single input stream for a relatively long time. Accordingly, a relatively low number of streams or symbols may be processed per second.

Sequential DFA execution also has a problem of instability of performance, i.e. severe performance degradation under stress. If DFA instructions are cached, each cache miss requires the sequential execution to stall until the cache fill returns. If multiple instructions must be executed per symbol on average, a common occurrence with DFA types when matching is in progress, then sequential execution takes proportionally more time.

Existing solutions have employed high-level hardware parallelism to increase aggregate throughput while scanning multiple streams in parallel. A hardware DFA engine can be replicated to offer parallelism in this manner. Although high-level parallelism increases aggregate throughput, it does not increase per-stream throughput.

At least one existing solution has employed mid-level "interleaved" hardware parallelism to increase both aggregate throughput and efficiency. In this solution, a portion of the hardware resources, notably the execute pipeline and the instruction memory or cache port, are shared for scans of several independent streams in parallel. A shared resource is used each clock cycle for one of the streams. If an N cycle loop is required to take one DFA step, N streams may be able to share resources in this manner. Although this may increase aggregate throughput by the factor of N and improve efficiency by sharing certain hardware resources, per-stream throughput is not affected. Also, other hardware resources such as queues and data buffers cannot be shared. Rather, they must be replicated N times. Performance instability is also not improved.

In an embodiment of the invention, in finding rule matches within an input stream by executing a Deterministic Finite Automaton (DFA) in a hardware engine, parallel multithreading is utilized to provide improved peak throughput and resistance to delays. Parallel threads are dispatched to perform DFA descents starting in a root state at varying positions in the input stream. Threads share execute resources but scan independently. A start block cache provides a first instruction for each thread at dispatch. A token block can sort tokens output from the execution results and may resolve speculative results so that an earlier match may affect later matches.

Abbreviations for "regular expression" include "regex" and regexp" and these abbreviations may be used throughout this specification interchangeably with each other and with the term "regular expression". It is understood by those skilled in the art that regular expressions are but a subset of the types of rules that can be utilized to find matches within an input stream. Those skilled in the art will understand that "rules" or "rulesets" are a term that includes regular expressions as well as other types of rules used in matching exercises. Where the term "regular expressions" is used, it is also understood that this includes the broader term "rules" and is not meant to limit the discussion to the term "regular expressions".

In an embodiment, non-Aho-Corasick DFAs are executed. Multiple threads are dispatched to execute independent DFA descents starting at different points in the input stream. These threads execute in parallel using shared hardware resources, e.g. thread storage, instruction memory or cache (L1 Cache) ports, execute pipelines, input data access ports, and match output ports.

A DFA descent is a transition through a series of states. All input searches must proceed from a start state. A start state is typically referred to as an initial state or a root state. As characters are read in, they are compared to output transition arcs in the current state. The DFA instructions are a specialized instruction set that is driven by a sequence of input symbols. Depending on the input symbol, the instructions do something (execute)—comparison and arithmetic calculations. For example, an instruction may command that if the next symbol is "a", a next state should be entered by accessing a next instruction at a first address, and if the next symbol is "b", a next state should be entered by accessing a next instruction at a second address. While this is a very basic example, one skilled in the art will understand DFA descents and the possible complexity of same.

FIG. 1 is a block diagram of a regular expression matching architecture. In FIG. 1, regular expression (regex) matching engine 100 comprises: Symbol Buffer Block 110; Start Block Cache 120; Dispatcher Block 130; a first Executer 140; a second Executer 150; instruction memory 160 and Token Block 170. During this discussion an Executer may be referred to as an Execute Block or an Executer Block. It is understood that these terms are interchangeable and may be used as such throughout.

The Symbol Buffer Block 110 is operatively coupled to the first Executer 140, second Executer 150 and the Dispatcher Block 130. The Start Block Cache 120 is operatively coupled to the Dispatcher Block 130. The Dispatcher Block 130 is operatively coupled to the first Execute Block 140 and the second Executer 150. The first and second Executer 140, 150 are operatively coupled to the instruction memory 160 and the Token Block 170.

The First Executer 140 comprises Thread Contexts 142 and Execute Pipelines 144. The Second Executer 150 comprises Thread Contexts 152 and Execute Pipelines 154.

In an embodiment of the invention Symbol Buffer 110 has the functionality to provide symbol compression, via equivalence classification tables. In some instances, a ruleset treats groups of symbols identically. For example, a text ruleset treats all non-ASCII bytes identically. Or, a case insensitive ruleset treats upper and lower case pairs identically. Under such circumstances, the symbol codes are remappable to a smaller number of codes for equivalence classes (EC) of those symbols, and all regex operations can be done on those ECs instead of the original symbols. This allows the DFA to be represented using fewer instructions.

In an embodiment of the invention, Symbol Buffer 110 provides for remapped ECs both for initial instruction fetches from a start block in the Start Block Cache 120, i.e. reading the start block at an offset determined from the EC, and for instruction execution in the execute blocks 140,150. Also, EC remapping can be utilized only for start block access. In an embodiment of the invention, EC remapping may be omitted, whereby raw symbols will be used for start block access and subsequent instruction execution. In an embodiment of the invention, the symbol buffer 110 is a cache. It is understood that the start block can utilize either symbols or ECs. Throughout this disclosure, where one term is used, symbol or EC, it is understood that this may include either.

In an embodiment of the invention the Symbol Buffer 110 maintains a sliding window of symbols in the data stream. For instance, a data file may be 1 MB long. However, the Symbol Buffer 110 window may only be 4 KB long. The window restricts the available symbols from the input stream. Accordingly, all threads will have to be within the same window to continue execution. Further, a slow, or long thread, will anchor the tail of the window. Dispatch of new instructions and symbols will have to wait until the window moves with a long thread. In an embodiment, the Executer (140 or 150) will publish to the symbol block 110 the leftmost current position of any active thread to maintain the window integrity.

Start Block Cache (SBC) 120 is connected to the Dispatcher 130. The SBC 120 holds start blocks. Start blocks are blocks, sequences or sets, of instructions associated with start (root) state(s) of the DFA. The SBC is a hardware managed cache connected to an external memory agent (not shown). The start block required for a particular job will be pre-fetched (if not present) before the job is scheduled.

In an embodiment of the invention, the Start Block Cache 120 can hold sixteen 256-entry start blocks, for example. In an embodiment, the same memory might hold thirty-six 112-entry start blocks if EC compression occurs. The replacement policy for start blocks can be least recently used (LRU). The SBC 120 holds instructions for transitions from the DFA start (root) state only. There is a start block within the SBC 120 containing an instruction for each possible symbol or EC value from the symbol buffer 110. By reading the start block at an address corresponding to the symbol or EC, the first instruction, fetched from the SBC 120, and first symbol dispatched correspond. Which start block to access is determined by the DFA or rule group currently in use. The symbol, or EC, determines an offset to access inside that start block. The SBC 120 has the capability to cache multiple start blocks. This is useful if there are multiple DFAs corresponding to multiple rulesets to facilitate scanning each packet with a selected ruleset. In an embodiment of the invention, the start blocks are of the same size. However, in an alternate embodiment the sizes are variable. In the event that the SBC 120 does not have a required start block for a particular symbol or EC, the SBC 120 will read the appropriate start block from external memory. The SBC 120 will make room by an appropriate policy. The policy used to make room is understood in the art and can be any of a variety of policies.

As stated, the SBC 120 contains instructions encoding transitions from the root state of the DFA. Each dispatched thread must first transition from the DFA root state, requiring an instruction from the SBC 120. When each thread is dispatched, the SBC 120 is accessed using the first symbol for that thread, retrieving the thread's first instruction, which is sent with the dispatch into a Thread Contexts 142,152. In an embodiment, each thread's first instruction is obtained without requiring a pass through an Execute Pipeline 144,154 or access to the instruction memory or L1 Cache 160. In many applications, a predominant number of threads terminate after only one or a few steps. Providing the first instruction by such a dedicated mechanism can substantially decrease the load on those resources. Another advantage of the SBC 120 is that the entire start block is rewritable into the SBC 120 before the scan begins, so there is a reduced chance of a "cache miss" while accessing the first instruction for each thread.

The SBC 120 supports multiple DFAs, built from various groups of rules, such that each input stream may be scanned using a chosen ruleset, or the Dispatcher 130 may switch from one rule group to another during a single input stream. The SBC 120 has space for multiple start blocks. If there are more DFAs than the capacity of the SBC 120, then start blocks may be swapped into the SBC 120 dynamically, giving it cache-like behavior. Advantageously, while scanning a current input stream, the start block needed to scan the next input stream may be pre-loaded in the background if not present in the SBC, thus covering SBC 120 "cache miss" latency.

The Dispatch Block 130 fetches instructions from the Start Block Cache 120 and sends instructions into the Execute. Blocks 140,150 as requested. The Dispatcher Block 130 can fetch two instructions from the Start Block Cache 120 and can dispatch two instructions—one to each of the Execute Blocks 140,150—per cycle. The Dispatcher Block 130 also keeps a buffer of the next symbols from the input stream (16 symbols, for example). The Dispatch Block 130 sends all dispatch information (symbols and first instructions, for example), into an available thread context within the Execute Blocks 140,150 (see FIG. 2, thread contexts 211-215). The Thread Contexts 142,152 (see also FIG. 2, 211-215) arbitrate to enter the pipelines 144,154. It is understood in the art that arbitration can be by any commonly used means.

Thread dispatch, in essence, comprises instruction fetch from the start block cache 120 and dispatch of instruction and data to a thread context 142,152. The Dispatcher 130 will execute a loop for each symbol in the symbol buffer 110. Accordingly, in an embodiment of the invention, the Dispatcher will take the first byte from the symbol block and make the first root state transition. This is due to the fact that the Dispatcher 130 must take the symbol from the Symbol Block 110 and use it to access the first instruction from the start block cache 120. As stated, this first instruction and corresponding data are dispatched. The Dispatcher 130 is always looking for a free context to dispatch into.

Instructions for transitions from non-root states are accessed by the execute blocks 140,150 through the L1 cache 160. The first instruction, included from the SBC 120, as noted above, with dispatch, may access other instruction blocks corresponding to next states residing in the instruction memory 160. Such a next state block contains instructions accessing other state blocks, also accessed through the instruction memory 160 and the remainder of the instructions required for a DFA descent occurs via instruction memory 160 access. One port of the instruction memory 160 is dedicated to each execute block 140,150.

In an embodiment of the invention, there is only one execute block (140 or 150). A plurality of threads operate within the single execute block. The instruction memory 160 is non-blocking so that a cache miss will not prevent the cache 160 from servicing other cache requests. The cache 160 control logic will keep track of pending requests so that subsequent requests to a cache line for which a request is already pending are handled correctly. Some attributes of an L1 Cache are highlighted here and it is understood by those skilled in the art that many well-known cache architectures are suitable. Further in an embodiment of the invention, the dispatcher 130 comprises logic inside the executer 140,150 and functions appropriately to determine start positions for new threads. However, in a multi-executer embodiment, a central dispatcher 130 assigns each start position to just one executer.

Accordingly, each thread begins with a dispatch for a given start position, and the thread handles the DFA descent from that position. All threads in the execute blocks 140,150 work on DFA descents within the same input stream, resulting in high single stream throughput. The instructions for a single DFA descent are kept ordered by execution by a single thread. As such, there is no need to order execution of instructions for multiple DFA descents. As the plurality of threads work concurrently on their DFA descents, the threads consume input symbols during DFA state transitions fetched from the Symbol Buffer 110. Accordingly, each of the plurality of threads may be working at different positions in the input stream. Any thread which is ready to execute is allowed to enter the pipelines 144,154, without regard for thread position in the input stream. Dispatch ordering may be re-imposed by the Token Block 170.

The execute blocks 140,150 also fetch symbols, or ECs, from the Symbol Buffer 110 as needed. In an embodiment of the invention, the Symbol Buffer 110 is operational as a Symbol LUT (Lookup Table) and provides symbol compression via equivalence class information.

In operation, to find all matches regardless of overlap, one thread is dispatched starting at each symbol of an input stream. As discussed, thread dispatches are performed by the Dispatch Block 130, and received by one or more Execute Blocks 140,150, each of which contains Thread Contexts 142,152. The Dispatcher 130 dispatches a first instruction, pointer information and data. The thread context will flow through the executer (See FIG. 2 and associated discussion), and then return to get instruction memory 160 instructions. Each instruction within the threads inform the descent. The instruction tells the system how to deal with the current state. For instance, a received next character "a" will tell the system to go to a first location and a received character "b" will tell the system to go to another location. Those skilled in the art will understand that a simple 2 state transition is discussed above. Transitions from a state with 30 such transition possibilities, for example, may not explicitly be in the instruction as such. In such a circumstance, there will be a block of possible instructions for the state. The next symbol received will be added to the current base address. This will take the thread to the next state transition instruction from the block of instructions. However, if an instruction has an explicit failure implied then the next instruction does not need to be looked up. Anything that is not a valid transition instruction (i.e. it does not correspond to a transition from a DFA state) is a failure instruction. In this circumstance, the thread context can dump the thread. It will then get a new dispatch from the Dispatcher 130.

There may be a limited dispatch rate. For example, one thread is dispatched per clock cycle to each Execute Block 140,150. Thus, the Dispatcher 130 dispatches 2 instructions per cycle. Dispatch may slow down or pause if one or more Thread Contexts 142,152 is full, or next input symbols are not yet available, or the Start Block Cache 120 does not yet contain the start block for the next DFA descent.

In one embodiment, there are two (2) Execute Blocks 140, 150, and dispatch rate is up to 2 threads per clock cycle, resulting in net scan speed of 2 symbols per cycle through the data stream. It is understood that there may only be one (1) Execute Block. The symbols per cycle is scalable. The number of execute blocks 140,150 shown in FIG. 1 is variable. An increase in the number of execute blocks 140,150 can be achieved without increasing the dispatch rate. Four (4) execute blocks (not shown) and two threads per cycle dispatch has the same top speed of 2 symbols per cycle. However, each execute block needs to accept a new dispatch only once per 2 cycles on average. Accordingly, each thread can do twice as much computational work in its associated execute block without slowing down the system.

Inside each Execute Block 140,150, a Thread Contexts 142,152 holds context for all active threads within that Execute Block 140,150. A thread context 142,152 includes the starting symbol (dispatch) position of the thread, a reference to the current DFA state, the thread's next instruction to transition from the DFA state, one or more next symbols from the input stream, and additional application-specific matching state, such as the end position of the last match found. As discussed above, each thread from a Thread Context 142,152 makes progress by entering a pipeline 144,154 to execute its current instruction, accessing/requesting/reading a next instruction from the memory 160, returning to the thread pool, and repeating until the matching terminates. A thread is ready to enter the pipeline 144,154 if it has its current instruction and data (symbols or ECs). The scheduler 220 (see FIG. 2; not shown in FIG. 1) arbitrates pipeline 144,154 access by selecting a ready thread to enter each pipeline. Each thread's DFA descent is independent of the others (except that its results may be speculative and discarded by the token block 170 if they don't apply).

The Execute Block 140,150 also contains at least one Execute Pipeline 144,154, in Which a thread is decoded and instructions are executed. FIG. 1 shows two (2) pipelines but it is understood that a single pipeline is within an embodiment of the invention. In the Execute Pipeline 144,154, a thread execution may comprise: making a DFA state transition, accessing/requesting/reading a next instruction from the memory 160, finding a match, outputting match information, and reading additional input symbols. After a thread executes in an execute pipeline 144, 154, the thread may return to the thread contexts 142, 152, or may terminate its DFA descent and free its place in the thread contexts 142, 152. Next instructions from the memory or L1 Cache 160, and additional input symbols from the Symbol Buffer 110 may be returned to the Thread Contexts 142, 152 in the background, while their requesting threads are waiting in the Thread Contexts 142, 152. Each Execute Pipeline 144,154 may be several pipeline stages long (see discussion in connection with FIG. 3), so that multiple clock cycles are needed to traverse it. Thread instructions which are ready to execute (having their next instruction and symbol(s) in the Thread Contexts 142,152) arbitrate to enter an Execute Pipeline 144,154. A Scheduler (see FIG. 2, 220) grants access, ordinarily to at most one thread per Execute Pipeline 144,154 per cycle, for example by "round robin" arbitration. Many methods of arbitration are known in the art and may be employed here.

Each thread may consume characters to make DFA transitions slower than the dispatch rate. Thread speed may be limited by the length of the Execute Pipeline 144,154 within each Execute Block 140,150, delays scheduling into the Execute Pipeline 144,154 in competition with other threads, time to access instruction memory or cache for the next instructions, input data, and backpressure from the match output path into the Token Block 170. In one embodiment, the minimum time to schedule into the Execute Pipeline, traverse it, read a next instruction, and return to the thread pool is 4 clock cycles, resulting in a maximum thread speed of 0.25 symbols per cycle. Nevertheless, the overall multi-threaded scan speed may maintain 2 symbols per cycle. This is because thread instructions execute in parallel, and it is the dispatch rate that determines overall scan speed seen from the outside. A high dispatch rate may be maintained in spite of individual thread delays, such as cache misses or long DFA descents, making the performance of this multi-threaded architecture much more resilient under stress compared to sequential methods.

In some applications, it is desirable to find all matches to all rules within the input stream. In other applications, it is desirable for earlier matches to affect later matches. One example is "longest-leftmost" or "greedy" matching, commonly used for language or protocol parsing, in which overlapping matches are not permitted. In greedy matching, among all matches the one with the earliest (leftmost) start position should be reported. Among multiple overlapping leftmost matches, the longest one should be reported. Additional matches are reportable only if they begin after the end position of the last reported match. The DFA itself can be constructed to support returning the longest match, but returning the longest leftmost match means that an earlier match in the input stream blocks some later overlapping matches. Another example of earlier matches affecting later matches is dynamic rule group changes. A rule may be written to specify that after matching, a different rule group, and hence a different DFA, should be used for further matching. In this case an earlier match that changes rule groups drastically affects later matches.

In a traditional sequential DFA matching, it is straightforward for an earlier match to affect later matches. For example, greedy matching can be implemented by beginning the next DFA descent from the symbol after the end of the last match, rather than the symbol after the beginning of the last descent. Likewise, dynamic rule group changes can be implemented by beginning the next DFA descent from the root state of a different DFA.

In this multi-threaded DFA matching architecture embodiment, it is challenging for an earlier match to affect later matches. Threads are dispatched rapidly, such as 2 instructions per cycle, to scan from a multitude of input positions, without waiting for previous threads to finish. That dynamic helps obtain the performance benefits of parallelism. Various threads may consume varying numbers of input symbols, and may experience varying delays, so that the thread that is dispatched first is by no means guaranteed to finish first. In general, threads may output matches, and finish scanning, arbitrarily out of order; and at the time a match is reported by one thread, there may be many other active threads that were dispatched at input positions to the left or to the right along the input stream.

To enable earlier matches to affect later matches in this architecture, thread dispatches, and matches reported by dispatched threads, are considered speculative. If conditions for reporting a given match are later found to be unmet, it may be discarded; and if conditions for dispatching a thread are later found to be unmet, then the thread is terminated (removed from its Thread Contexts 142,152). An embodiment is implemented to resolve speculative matches, in a manner producing the same sequence of matches as a traditional sequential DFA scanner would have produced.

In an embodiment of the invention, the Executer 140,150 does not receive symbols or root state instructions from the dispatcher 130. The Executer 140,150 receives root state instructions and subsequent instructions from the instruction memory 160. In this embodiment, the dispatcher 130 would not utilize a start block cache 120 to get root state instructions. The Executer 140,150 also receives first symbols for a DFA descent and subsequent symbols from the symbol buffer 110. The dispatcher 130 sends DFA descent starting positions to the Executer 140,150. Also, in an embodiment of the invention, the dispatcher 130 does not utilize a start block cache 120. The dispatcher 110 fetches start blocks from the instruction memory 160. It is understood that a multitude of combinations of the dispatcher 130, start block cache 110 and Executer 140,150 are possible. The dispatcher 130 could receive root state instructions from the instruction memory 160 and dispatch those instructions to the Executer 140,150. Or, for example, as described above in regard to FIG. 1, the dispatcher 130 could receive root state instructions from the start block cache and symbols from the symbol buffer 110.

Each match by any thread results in match information communicated out of the Execute Block 140,150, for example an identifier of the matched rule, the start and end positions of the match, the thread location producing the match, and the dispatch location of that thread within the input stream. This information for a single match is called a "token". Speculative tokens from threads running in Execute Pipelines 144,154 within Execute Blocks 140,150 are communicated to a Token Block 170, which will resolve these speculative tokens into final tokens and other actions. A speculative match, resulting in a speculative token, is a complete expression match by the DFA. It is called "speculative" because at the time the match was found, it was not known for sure whether a dispatch "should have" been made for that position. An output from the token block 170 is a final output indicating that the desired regex matches. The output goes to the parent module, calling software, or appropriate program.

The Token Block 170 sorts the matches into the order of their original thread dispatch, using dispatch position information that is communicated with the match information. Many known methods of sorting are applicable here. In one method, each Thread Contexts 144,154 location corresponds to a token queue, implemented in a single or multiple memories. A token queue is a FIFO associated with a single thread, or thread context, holding the tokens emitted by that thread. The token queue aids in the sorting process. The token queues feed tokens into a sorting tree, where each node of the tree accepts two or more input tokens, and outputs the token with the earlier dispatch position.

In one embodiment of the invention, there is not a sorting tree, but rather a sorting machine reads tokens from the various queues in the proper order, by looking up the queue number corresponding to the next dispatch position. Each execution block 140,150 output is a token (or a non-token status such as completion without a match). And the token block 170 sorts the tokens according to information based on dispatch—namely, based on dispatch position.

In an embodiment of the invention, the Token Block 170 does not do any sorting or filtering. In such an embodiment, all tokens will be reported as received.

In aggregate, the token sorting is not a FIFO, because tokens are not necessarily output by the execute blocks 140, 150 (nor by a single execute block 140 or 150) in order of dispatch. Threads are not forced to execute in order (as previously discussed), and so threads can output tokens in a different order than those threads were dispatched.

Having sorted the speculative tokens into dispatch order, the token block 170 finishes resolving matches by a filtering stage. The first sorted token is considered to be valid, and is output. Then, if it was for a greedy match, further tokens that overlap its match location are filtered out, and discarded; the next non-overlapping token is considered valid, and so forth. For example, the first (leftmost) match is kept, and other overlapping matches are discarded. If the input "abcdefg" leads to matches "abcd" and "cdef" and "fg", then "abcd" is retained, being the leftmost, and "cdef" is discarded and "fg" is retained.

If a valid match indicates a change in rule group, then dispatch is halted—active scan threads are terminated, all further sorted tokens are discarded, and dispatch is re-started after the indicated location of the rule group change, using the start block for the DFA of the new rule group. This operation may involve a loss of time and bandwidth, because dispatch would typically have progressed well beyond the location of the rule group change, and is restarted earlier, at the location where the new rule group begins; so thread dispatch is effectively repeated for some symbol positions, in the new rule group.

Figure 2:
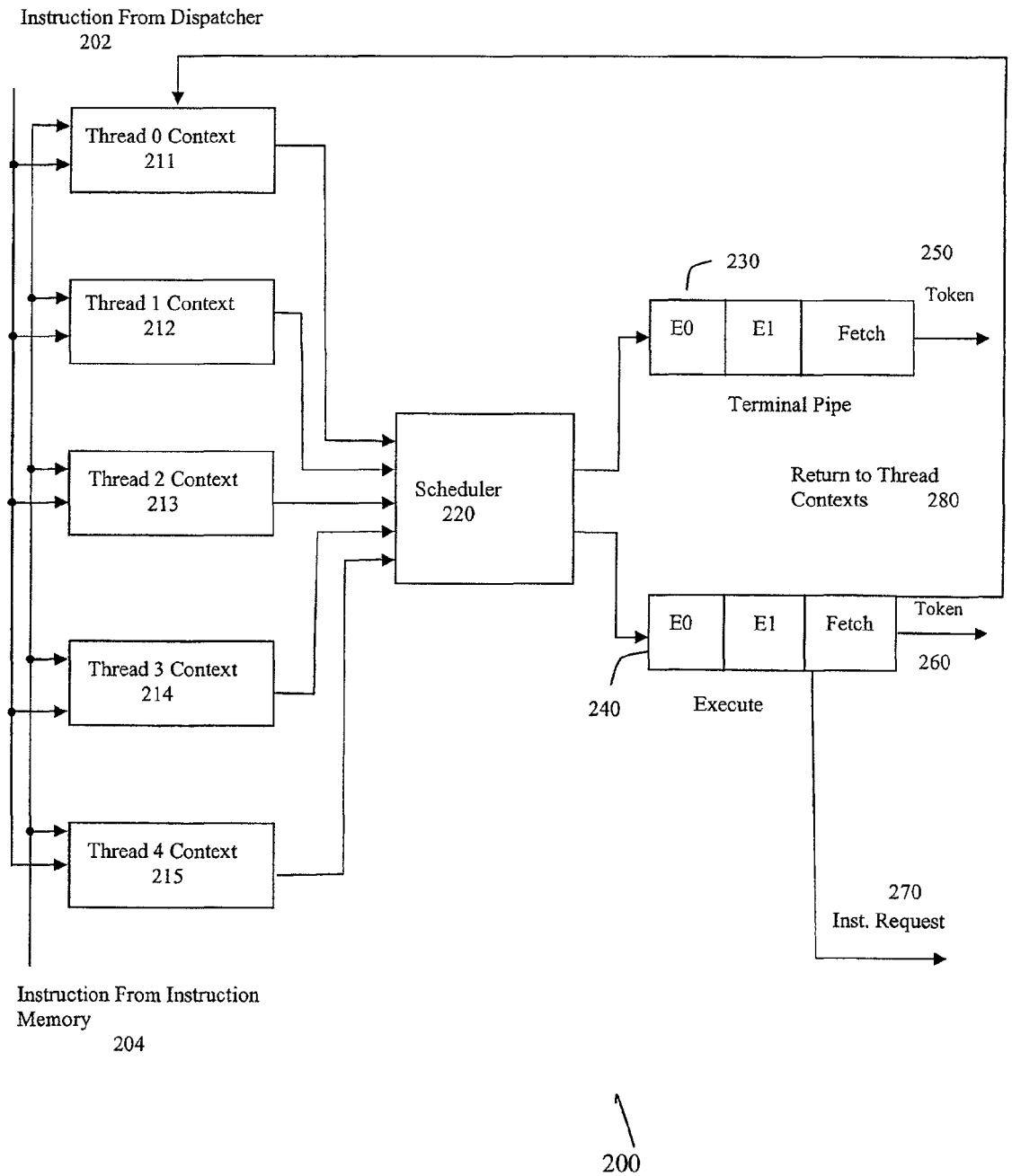
FIG. 2 is a block diagram of an execute block.

FIG. 2 is a block diagram of an Execute Block. In FIG. 2, Execute Block 200 comprises: an input 202 from Dispatcher Block; an input 204 from L1 Cache; a plurality of Thread Contexts 211,212,213,214,215; a Scheduler 220; a Terminal Pipeline 230; an Execute Pipeline 240; an Instruction Request output 270; and a first and second Token output 250,260.

The input 202 from the Dispatch Block and input 204 from the L1 Cache are operatively coupled to the plurality of Thread Contexts 211-215. The Thread Contexts 211-215 are operatively coupled to the scheduler 220. The scheduler 220 is operatively coupled to the Terminal Pipeline 230 and the Execute Pipeline 240. The Terminal Pipeline 230 is operatively coupled to first Token 250. The Execute Pipeline 240 is operatively coupled to second Token 260 and Instruction Request 270.

In an embodiment of the invention, non-Aho-Corasick DFAs are executed. Multiple threads are dispatched to execute independent DFA descents starting at different points in the input stream. These threads execute in parallel using shared hardware resources, e.g. thread storage, instruction memory or cache (L1 Cache) ports, execute pipelines, input data access ports, and match output ports.

As shown in FIG. 2, the Execute Block 200 comprises five Thread Contexts 211-215. In an embodiment of the invention four threads are sufficient to maintain a busy Pipeline 230,240 and process one byte per cycle. Five threads in each Execute block are shown in FIG. 2 and provide resiliency to the overall throughput for events including cache misses. Each Thread Context 211-215 maintains a context which is relevant to the current scan that is being performed. The information in the thread context is comprised as follows:

Start (Dispatch) Pointer in the symbol stream
Current Pointer in the symbol stream
CSC (Current Start Condition)
Last Accept Context
    LASF (LAS valid flag)
    LAS block base address
    LASC (LAS character)
    LASP (LAS pointer, the pointer past LASC, two after the short match end)
Trail Head context
    THF (valid)
    THC (trail head character class)
    THP (trail head pointer)
Instruction (next instruction to be dispatched)
Instruction Type (Final Terminal or not)
Symbol Buffer (Eight characters are stored in the symbol buffer which is refilled as necessary)
Cache Miss Context
In Sequence Inst (This flag indicates if the thread is currently executing a Sequence instruction. A sequence instruction will take two passes through the execute pipe to complete execution.)
Ready (bit indicating thread is ready to execute instructions. Thread may not be ready due to different reasons: Cache miss: Character Buffer is empty or there are not enough characters to process a sequence instruction.)
SC flag (This flag inverts with every start condition change. It is used for filtering tokens when a start condition changes.)

In an embodiment, the Thread Contexts 211-215 can receive multiple symbols at a time from the Dispatcher 130 or the Symbol Block 110. The Thread Contexts 211-215 will have storage for 8 next symbols, for example. More storage is possible to maintain Thread Context integrity. If a thread is executing, the Thread Context 211-215 will request symbols to fill any storage space that is not currently full of next symbols. It is understood in the art that the Symbol Block 110 is constructed to satisfy such requests for additional symbols.

Each Execute Block 200 comprises a Thread Scheduler 220. The scheduler 220 selects one of the Thread Contexts 211-215 that needs the execute pipeline 240 and one that needs the terminal pipeline 230. On each clock cycle, a thread can be scheduled into the execute pipeline 240 and one thread can be scheduled into the terminal pipeline 230. In an embodiment of the invention, the scheduling is performed in a round-robin manner. The final terminal pipeline only handles the last instruction of each DFA descent. However, each thread encounters a last instruction, so if 1 thread per cycle is dispatched, one final terminal instruction per cycle is processed. The terminal pipeline 230 does not require an Instruction memory 160 port and typically there is sufficient workload of final terminal instructions for the terminal pipeline to process. After pipeline 240 execution, a thread may either terminate its DFA descent and free its place in the thread contexts 211-215, or return to the thread contexts 211-215.

In an embodiment of the invention, the terminal pipeline 230 is not present. A single general purpose execute pipeline is used instead of having both an execute pipeline 240 and a terminal pipeline 230. In yet another embodiment, a plurality (2 or more) execute pipelines 240 are used. The utility of a terminal pipeline decreases if non-matching terminal instructions are simply dropped.

When a final terminal instruction is scheduled, the first instruction for a new thread is simultaneously scheduled into the Execute Pipeline 240. The selected thread replaces its context with a new thread context in the same cycle.

In an embodiment of the invention, the Execute Pipeline 240 is a single-instruction four-stage pipeline. All instructions other than final terminal instructions are executed in this pipeline.

Stage 0(S0): Stage 0 is the scheduler stage (which is shared between the Terminal Pipeline 230 and the Execute Pipeline 240).
Stage 1 (E0): This is the first stage of instruction execution.
Stage 2 (E1): This is the second stage of instruction execution. The next instruction address is sent to the Instruction memory 160 via the Instruction Request output 270.
Stage 3 (F0): After this stage, the thread either returns to its thread context 211-215, or terminates its DFA descent and frees its thread context 211-215 to accept a new dispatch.

In an embodiment having an Execute Pipeline 240 and a Terminal Pipeline 230, the Execute Pipeline 240 only emits Tokens 260 of non-final terminal instructions. This may happen when a rule accepts a variable number of symbols at the end: cat[0-9] {1,3} matches "cat" followed by a number containing from 1 to 3 digits. If the input string is "cat782 now" as soon as it's matched "cat7" the execution pipeline will emit a token for that rule. It is a non-final terminal because the match can be extended.

All final terminal instructions are scheduled into the Terminal Pipeline 230. This pipeline is a single instruction four-stage pipeline to match the number of stages of the Execute Pipeline 240.

Each thread has a token FIFO and a token memory dedicated to it. Each token (stored in the token memory) comprises the following information:
Start Pointer
End Pointer
USC (Use Start Condition)
SC (new start condition)
PT (Pre-translation token)
BUA (backup action—where token filtering should allow next greedy match)
Trail Head Pointer
JT (Job terminate)
TOK (ID of rule matched)

Each entry in the token FIFO has the following data:
Busy flag
Valid flag
Start Pointer
Token Pointer (This gives the memory address of the actual token in the token memory. Assuming 32 tokens per thread, this is 5 bits wide.
SC flag (this flag is inverted with every start condition Change. It is useful to filter tokens when a start condition changes).

The token memory contains the actual tokens.

Figure 3:
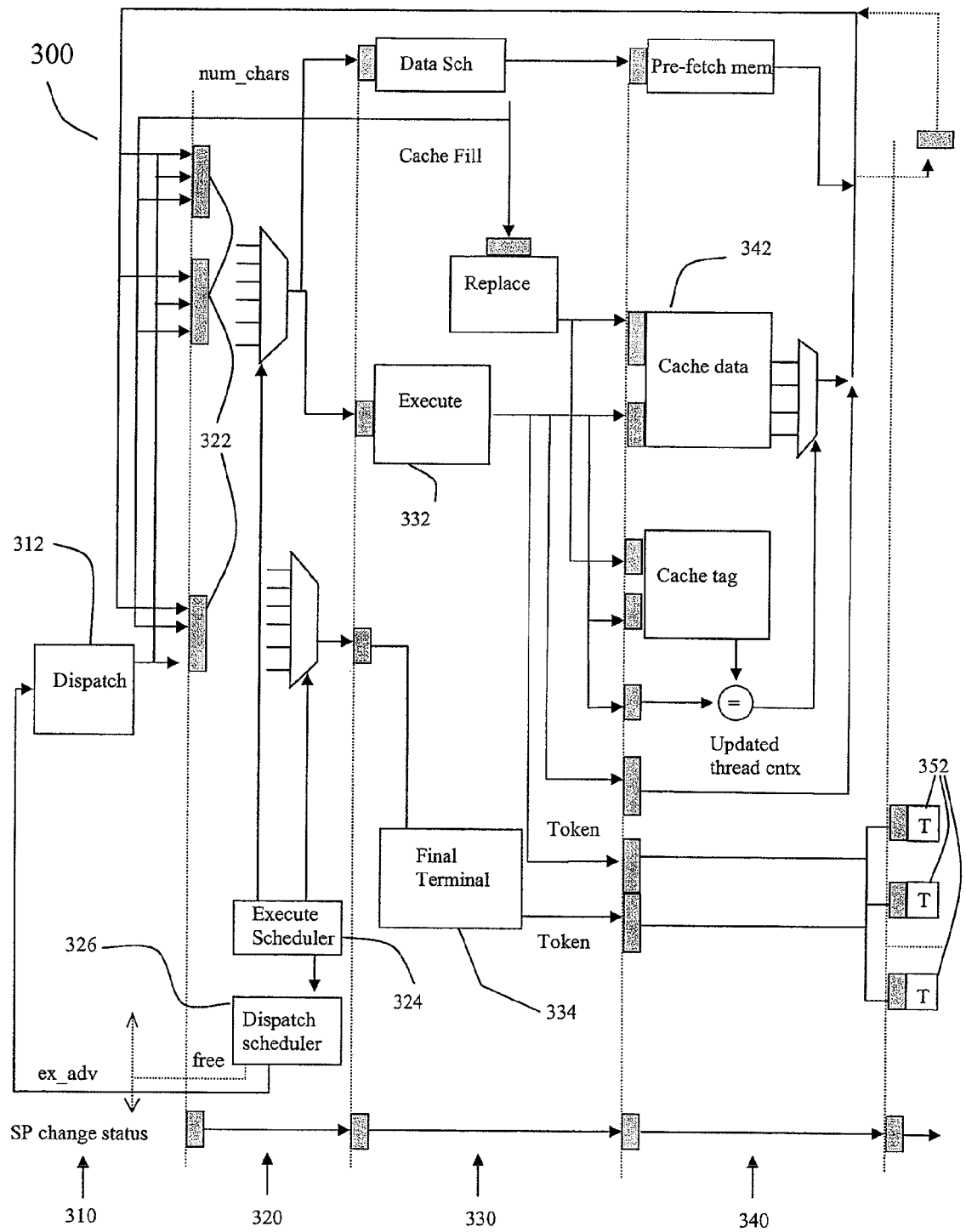
FIG. 3 is a functional diagram of four stages of DFA execution.

FIG. 3 is a functional diagram of the four stages of DFA execution. The four stages comprise: a scheduler stage (stage 0) 310, a first instruction stage (stage 1) 320; a second instruction stage (stage 2) 330; and a reading cache stage (stage 3) 340. It takes 4 cycles per step on a thread (this equates to 1 loop on a thread every 4 cycles).

The scheduler stage 310 comprises the dispatcher 312, dispatcher 130 in FIG. 1, which is operably connected to the thread contexts 322 in the first execution stage 320. As previously stated, each dispatch by the dispatcher 312 provides information to the thread contexts 322 regarding start state instructions. Each dispatch from dispatcher 312 contains a start pointer (SP), first instruction and the next few symbols (SP+1, SP+2 . . . ). Each thread context 322 performs instructions on a thread until the thread terminates or finds a match. A given thread context 322 is updateable either from execute results, cache fill or dispatch scheduling. Each thread context 322 communicates to the executer 332 via the execute scheduler 324. The execute scheduler 324 also communicates back to the dispatcher 312 via a dispatch scheduler 326. The dispatcher 312 will only dispatch information to a thread context 322 when a thread context 322 indicates that it is ready for more information from the dispatcher 312 and requests information. Threads that have a valid next instruction and next data component participate in execute scheduling. The execute scheduler 324 provides to the dispatch scheduler 326 the thread number of the thread that just became free by virtue of being selected for final terminal execution. The dispatch scheduler 326 will arbitrate between all free thread contexts and select a thread for a new dispatch. If the recently freed thread is not selected, it will be marked as free and will be part of the arbitration process for the next cycle. Scheduling of the thread contexts in performed by scheduling methods known in the art. Only the final instruction of a thread context is scheduled for the final terminal executer 334.

In the second instruction stage 330, the execute results contain the next instruction address, updated thread context and may contain a token. The terminal results may only contain a token. In any given cycle there can only be one token—either from executer 332 or from a final terminal executer 334. There may be threads in both the executer 332 and the final terminal executer 334, and either may have a token. However, both may not simultaneously have tokens because only one token may be written to the token FIFO each cycle. This restriction is enforced in the execute scheduler 324, which is able to see whether each arbitrating thread context has a token to output in its instruction, and will not schedule token threads into both executer 332 and final terminal executer 334 in the same cycle. The instruction from the cache fill will be deposited into the thread context 322 directly and the thread context 322 marked ready. In the cache stage 340 the cache maintains a history of all pending reads and it services them with priority. The next instructions and next data are independently written into thread context 322 when available. In the cache stage 340, tokens are written into token FIFOs. As shown in FIG. 3, there are 3 representative token FIFOs 352 shown, which correspond to the 3 representative thread contexts 322. Each token is written by a thread into the token FIFO 352 corresponding to its thread context 322, to facilitate token sorting. Each token FIFO maintains the start point of the thread. Any change to a start point is recorded.

Embodiments of the invention increase the speed of DFA execution per stream, by using multi-threaded hardware parallelism. The observed overall scan speed is no longer the speed of taking sequential DFA steps (one symbol per several cycles); instead, it is the speed of dispatching new threads at each scan position (one, two, or more per cycle). For example, embodiments operating at 2 dispatches per cycle yields up to 2 symbols per cycle observed throughput; this is 8 times faster than 0.25 symbols per cycle taking sequential DFA steps of 4 cycles each.

Embodiments enable single instances of hardware resources to finish scanning a single stream several (e.g. 8) times faster, so that fewer instances are needed to achieve a target aggregate throughput.

Embodiments decrease instability when the system is under stress, by allowing multiple threads to absorb delays from cache misses or many scan steps, without necessarily slowing the dispatch rate which is the observed speed. By scaling the number of execute blocks or pipelines, and the number of thread contexts, increasing amounts of stress can be absorbed without slowing the dispatch rate.

In an embodiment of the invention, the architecture is used for scanning network traffic for security threats, where the rules may match viruses, intrusion attempts, spam, blocked or allowed URLs; application recognition within network traffic; protocol parsing; natural language processing; database queries or file searches. In an embodiment of the invention, cross-packet matching is utilized, wherein the state of scan threads or previous packet data, or both, are saved to memory, to be retrieved when the next packet on the same stream is processed for continuous matching behavior.

In an embodiment of the invention, the multi-threaded DFA architecture described may be implemented in an integrated circuit, or in programmable logic such as an FPGA. It utilizes a process or method of supplying input data, accessing DFA instructions, and communicating match information (tokens). All of these are readily implemented by many standard techniques known in the art. It also requires a method of encoding a DFA into instructions, and a corresponding hardware algorithm of decoding and executing the instructions. The architecture described does not assume any particular encoding or characteristics of instructions execution. Rather, this invention teaches how to convert a general class of sequential-based DFA scanners into parallel multi-threaded scanners operating on the same instructions with the same execution algorithms. Many straightforward encodings are therefore applicable to this invention, such as representing each state with a block of instructions, one instruction per possible input symbol, where each instruction represents a transition from this state to another state upon consuming the symbol corresponding to its offset in the block, and such transition instruction contains the base address of the instruction block of its destination state, with a flag or null address indicating no transition, and a flag or token ID indicating a rule match which should trigger output.

Such a silicon or programmable logic implementation of this architecture may be connected to one or more host processors, from which to receive input data, and to which to communicate matches (tokens). For example, such processors may be embedded in the same silicon device, such as a network processor, DSP, or other single-core or multi-core device. Alternatively, such processors may be external to the device implementing this architecture, and may communicate with the device by standard or custom communication busses and protocols, such as 1G, 10G, or 100G Ethernet, XAUI or PCI Express.

Regular expressions or similar rules are compiled by well-known techniques, first into NFAs and then into DFAs by subset construction algorithms, and finally converted into instructions for the hardware DFA engine, and loaded into device or system memory where the DFA engine can access them. Streams, packets or files to scan as input are communicated into the DFA engine, and tokens are received from the DFA engine. A host processor may respond to tokens with appropriate actions, such as blocking a packet in which a virus rule matched, or reporting a database hit in a file in which a query rule matched.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An architecture for finding rule matches within an input stream, comprising:
   a symbol buffer;
   a dispatcher operably connected to said symbol buffer and operably enabled to dispatch deterministic finite automata (DFA) descent starting positions;
   an instruction memory which holds instructions for transitions from DFA states;
   at least one executer which receives DFA descent starting positions from the dispatcher, retrieves instructions from the instruction memory and symbols from the symbol buffer, executes said instructions and performs parallel DFA descents starting in root states at varying positions in an input stream, and outputs a plurality of tokens from a plurality of the parallel DFA descents, wherein each token of the plurality of tokens includes information for a rule match; and
   a token processor which receives the plurality of tokens and sorts the plurality of tokens into dispatch order.

2. The architecture of claim 1, wherein the at least one executer comprises:
   a plurality of thread contexts which receive the starting positions from the dispatcher, the symbols from the symbol buffer, and the instructions from the instruction memory and which maintains a context for each thread which is relevant to a current descent being performed; and
   a scheduler which selects from the plurality of thread contexts and schedules a thread into an at least one pipeline on each clock cycle, whereby the threads transition concurrently within each of said executers depending on arbitration into the pipeline;
   wherein said pipeline executes instructions from contexts of threads scheduled into the pipeline and requests subsequent instructions from the instruction memory.

3. The architecture of claim 2, further comprising a start block cache holding instructions for state transitions from a DFA root state wherein said start block cache is operably connected to said executer and said executer is operably enabled to receive root state instructions from the start block cache.

4. The architecture of claim 3, wherein the dispatcher dispatches at least two (2) DFA descent starting positions per clock cycle.

5. The architecture of claim 3, wherein a portion of the tokens output by the plurality of executers comprise speculative tokens and said token processor filters the speculative tokens.

6. The architecture of claim 3, further comprising a terminal pipeline wherein the scheduler schedules the last instruction of each DFA descent for every thread to the terminal pipeline.

7. The architecture of claim 3, wherein each of said plurality of thread contexts store a plurality of symbols from the input stream and wherein each of said thread contexts request symbols from the symbol buffer when its thread context storage is not full.

8. The architecture of claim 3, wherein the symbol buffer maintains a sliding window of symbols in the input stream.

9. The architecture of claim 3, wherein the at least one pipeline is a single-instruction four-stage pipeline.

10. The architecture of claim 3, wherein the start block cache comprises a plurality of start blocks, each of said start blocks comprising an instruction for each possible input symbol, and wherein the first instruction needed by a thread is retrieved by accessing a selected start block at an offset determined by the first symbol to be consumed by the thread.

11. The architecture of claim 3, wherein the start block cache holds a plurality of start blocks and wherein the held start blocks are replaceable within the start block cache on an LRU policy basis.

12. The architecture of claim 3, wherein the dispatcher is operably connected to the symbol buffer and to the start block cache and operably enabled to dispatch root state instructions, symbols and DFA descent starting positions to the executer.

13. A system for finding rules matches within an input stream, comprising:
    at least one instruction executer, said instruction executer comprising:
        a plurality of thread contexts, each of said plurality of thread contexts maintaining a thread;
        a scheduler; and
        at least one pipeline;
    wherein said scheduler arbitrates the plurality of thread contexts into said at least one pipeline so that multiple threads perform concurrent deterministic finite automata (DFA) descents, wherein said at least one executer executes DFA descent instructions on the plurality of threads starting at varying positions in an input stream, wherein said at least one executer outputs token information to a token processor, wherein the token information includes information for at least one rule match determined by said at least one executer, and wherein said token processor sorts the token information into dispatch order.

14. The system of claim 13, wherein root state instructions are retrieved from a start block cache and instructions subsequent to root state instructions are retrieved from an instruction memory.

15. The system of claim 14, wherein symbols from the input stream are retrieved by the executer from a symbol buffer.

16. The system of claim 14, wherein the root state instructions for DFA descents are retrieved by a dispatcher and dispatched to the executer and instructions subsequent to the root state instructions for each thread are retrieved by the executer from the instruction memory.

17. The system of claim 14, wherein root state instructions for DFA descents are retrieved by a dispatcher and initial symbols for a thread are retrieved by the dispatcher from a symbol buffer and said root state instructions, initial symbols and a DFA descent starting position are dispatched to the executer and wherein the executer retrieves instructions subsequent to the root state instructions for each thread from the instruction memory and symbols subsequent to the initial symbols from the symbol buffer.

18. The system of claim 14, wherein said plurality of thread contexts holds context for all active threads within said at least one executer, the context for each thread comprising a starting symbol position of the thread, a reference to the current DFA state, the next thread instruction, and at least one next symbol.

19. The system of claim 18, wherein a thread is ready to enter a pipeline if it contains a current instruction and at least one next symbol and the scheduler arbitrates entry to the pipeline by selecting a ready thread.

20. A method of finding rule matches within an input stream, comprising:
    retrieving root state instructions;
    retrieving non-root state instructions for deterministic finite automata (DFA) descents subsequent to a root state;
    executing a plurality of threads of a DFA on an input stream based on the instructions, wherein each thread is started in the root state at varying positions in the input stream and the plurality of threads execute concurrently within the executer without regard for the state of another thread;
    outputting a plurality of tokens from the plurality of threads, wherein each token of the plurality of tokens includes information for a rule match; and
    sorting the plurality of tokens into dispatch order.

21. The method of claim 20, further comprising:
    filtering out speculative tokens from the plurality of tokens.

22. The method of claim 20, wherein said step of executing a plurality of threads comprises:
    scheduling the plurality of threads into an at least one pipeline, said at least one pipeline executing the instructions.

23. The method of claim 20, wherein the root state instructions are retrieved from a start block cache and the non-root state instructions are retrieved from an instruction memory.

* * * * *